No. 669,833. Patented Mar. 12, 1901.
C. L. HORACK.
BICYCLE.
(Application filed Aug. 4, 1897.)
(No Model.) 2 Sheets—Sheet 1.

WITNESSES: INVENTOR
Chas. L. Horack

UNITED STATES PATENT OFFICE.

CHARLES L. HORACK, OF BROOKLYN, NEW YORK.

BICYCLE.

SPECIFICATION forming part of Letters Patent No. 669,833, dated March 12, 1901.

Application filed August 4, 1897. Serial No. 647,031. (No model.)

*To all whom it may concern:*

Be it known that I, CHARLES L. HORACK, a citizen of the United States, and a resident of the city of Brooklyn, county of Kings, and State of New York, have invented certain new and useful Improvements in Bicycles, of which the following is a specification.

My invention relates to vehicles of various kinds, and more particularly to such vehicles as bicycles and tricycles or cycles in general, which may be propelled by the person seated or mounted thereon or by any suitable motor.

As all the improvements invented by me are especially applicable to bicycles, and as their construction and operation can be illustrated and explained in connection with bicycles, I will in the following specification and in the drawings accompanying the same make reference particularly to bicycles.

The objects of my invention are to provide means for neutralizing or reducing the shocks imparted to a bicycle owing to the roughness of roads and its meeting with obstructions in general and to protect the rider against such shocks and the reaction therefrom, also to provide and to so mount a suitable running gear upon portions of the frame and to so connect the same therewith and to so construct the frame as to secure proper operation of such running-gear under varying conditions of the frame and while relative displacements take place with reference to the portions of the frame with which parts of such running-gear are in operative contact.

I accomplish these and other useful objects by the means hereinafter described, and set forth more particularly in the claims.

In the accompanying drawings, forming part of this specification, and wherein like numerals of reference refer to corresponding parts, Figure 1 is a side elevation, Fig. 2 a ground plan, and Fig. 3 a front elevation, of a bicycle constructed according to my invention, the saddle being omitted in Fig. 2. Fig. 4 is a vertical section through the crank-axle and adjoining auxiliary shaft at right angles thereto, and Fig. 5 is a ground plan of the parts adjoining and surrounding the crank-shaft. Fig. 6 is a section along line 6 6 in Fig. 4, while the left-hand portion of Fig. 7 shows a horizontal section along line 7 7 in Fig. 6 and its right portion a top view of the right half of said Fig. 6. Fig. 8 is a longitudinal cross-section of the steering-head and its connecting parts. Fig. 9 is a vertical longitudinal section through the portions of the frame adjoining the saddle-post and the saddle as connected therewith. Fig. 10 shows a cross-section of the joint between the diagonal or down tube and the upper back fork, and Fig. 11 a side view of a flexible joint in the connecting-rod of the running-gear. Fig. 12 is a section along line 12 12 in Fig. 7. Figs. 1, 2, and 3 are drawn to a smaller scale and Figs. 6, 7, and 12 to a larger scale than the remaining figures.

The bicycle-frame in its general outlines corresponds with the diamond frame now in common use in bicycles except as hereinafter set forth. 21 is its upper main tube; 22, the lower main tube; 23, the diagonal or down tube; 24, the saddle-pillar; 25, the saddle; 26, the steering-head; 27, the handle-bars; 28, the handle-bar stem; 29, the crank-axle; 30, the pedal-bars, with their pedals; 31, the upper rear fork; 32, the lower rear fork; 33, the front fork; 34, the pilot-wheel, and 35 the driving-wheel.

The following parts constitute my preferred form of driving-gear.

36 is a disk fixedly secured to the left-hand end of crank-axle 29, so as to revolve therewith, and carrying an interior gearing concentric with said axle. 37 is a sectional casing for protecting said disk.

38 is a transverse shaft placed parallel with shaft 29, and 39 the shell surrounding the same and carrying its ball-bearings, while 40 is such a shell surrounding shaft 29. Said two shells are joined together longitudinally, so as to thereby always maintain the same distance between the axes of their shafts, and lower main tube 22 is fixedly secured to shell 40 and down-tube 23 to shell 39, and both said tubes are made continuous for the purpose of securing great rigidity to the frame at this point.

41 is a pinion on shaft 38, meshing with gearing 36. At the right-hand end of shaft 38 a crank 42 is attached thereto. A corresponding crank 43 is attached to the axle of driving-wheel 35, and a connecting-rod 44 is so articulated to said cranks that as they revolve it will describe a parallel movement and will impart a revolving motion from shaft 38 to said driving-wheel.

For the purpose of neutralizing shocks imparted to the wheels I employ a cushioned frame, as follows:

The upper rear fork is secured to the seat-frame by universal joint 45 and to the rear end of the lower rear fork by pivot 46, while the forward end of said rear fork is articulated upon shell 39, concentric with its axis, as more fully described hereinafter. The upper portion of fork 31 comprises a socket-piece carrying the sphere 48 of said universal joint and on its under side a tube 49, telescoping with another tube 50, secured to a socket-piece 51, from the under side of which the pronged portion of said fork extends at both sides of wheel 45. The interiors of tubes 49 and 50 are connected with the atmosphere.

52 is an inflatable pneumatic cushion, either annular in ground plan or of horseshoe form and made to rest in a suitable seat in the under side of socket-piece 47 and having its lower surface supported by a series of shoes 53, guided within socket-piece 51 and capable of adjustment toward and away from said cushion independent of each other by means of screw-thread arrangement, as 54, whereby it is possible to vary the number of contact-points on which said cushion is seated, as well as the degree of initial compression imparted to said cushion by either of said shoes.

55 is a spiral spring placed around tubes 49 and 50, so as to be protected and surrounded by socket-pieces 47 and 51 and by cushion 52. Its length is such that it does not come in operative contact with shoe 47 and is not compressed thereby until partial compression of cushion 52 has taken place. Thus this spiral spring is brought into action only when particularly heavy shocks are imparted to the bicycle, allowing free play to the air-cushion under ordinary circumstances.

Figures 4, 5, 6, 7, 9, 10, 11, 12:
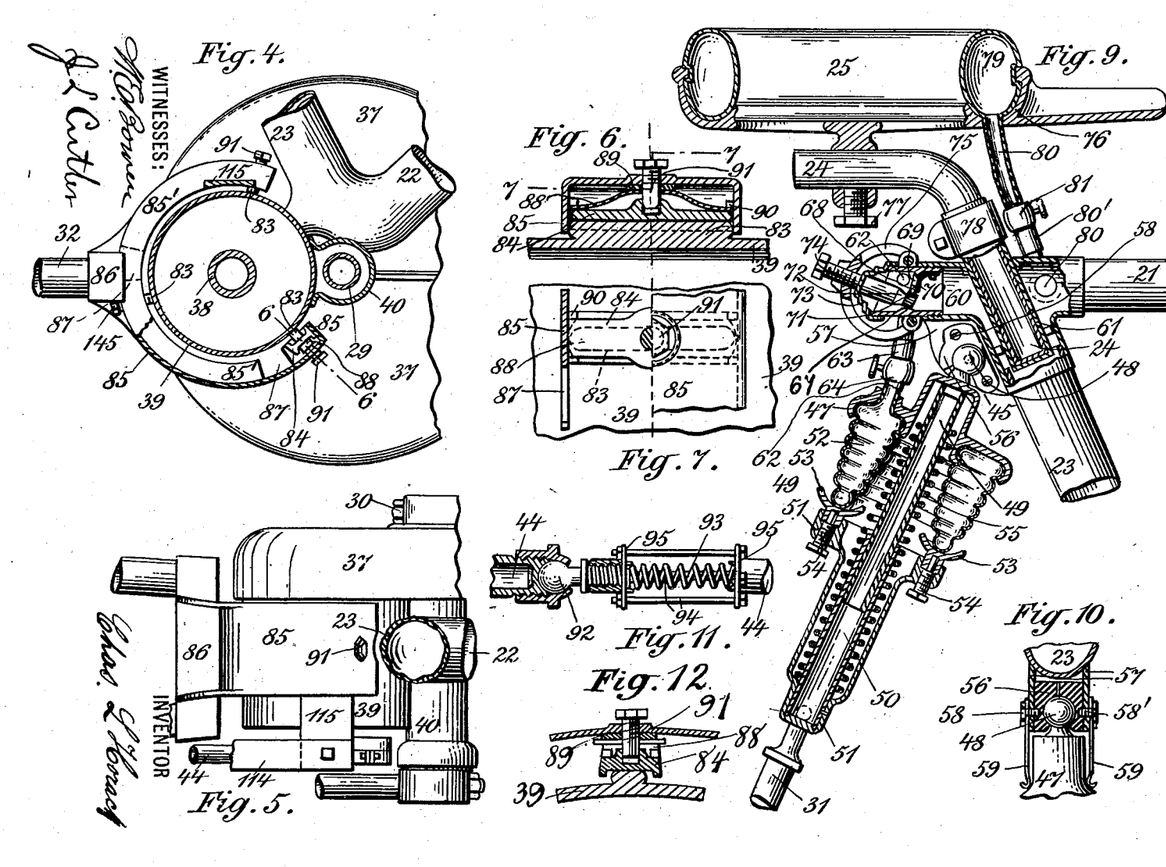

56 is the socket within which sphere 48 revolves. The same is secured to lugs 57 on the seat-frame by bolts 58 and 58'. 59 represents leaf-springs held by bolts 58 58' to said lugs and serving to yieldingly resist lateral deflection of socket-piece 47. When wheel 35 is made to pass over an abrupt elevation on the ground, the jar so produced will cause tubes 49 and 50 to telescope, so as to move socket-pieces 47 and 51 toward each other and to produce compression of cushion 52, the joints at each end of lower rear fork 32 at the same time accommodating themselves to such movement. When sufficient compression of said cushion has taken place, socket-piece 47 will come to rest upon and will compress spiral spring 55, thus increasing the yielding resistance available to resist further telescoping of tubes 49 and 50 and further approach of said rear wheel toward the saddle. While said cushion 52 alone or combined with spring 55 only might be employed to produce the desired cushioning effect within the frame, I prefer to materially add to the extent of the pneumatic cushioning device for the purpose of making it more sensitive and to also regulate the flow of the compressed air within the cushioning device so as to guard against too-sudden reaction taking place after compression produced by such shock. For such purpose I prefer to connect cushion 52 with the interior of the main bicycle-frame and to also employ in combination and in connection with cushion 52 a flexible pneumatic cushion interposed between the main bicycle-frame and the seating-surface on the saddle. The following construction may be employed to accomplish these results:

60 is an extension of upper main tube 21 in the rear of diagonal tube 23, and 61 a socket adapted to receive saddle-pillar 24 and so inserted and firmly held within tube 23 at the junction of these parts as to leave air-passages around it between said tubes. 62 is a connecting-tube between cushion 52 and extension 60. The same may be provided with a suitable detachable coupling 63 and a stopcock 64 to permit of regulating the flow of air between these portions of the cushioning device. Said tube is made flexible to enable it to accommodate itself to the relative displacements which take place during varying compressions of cushion 52 between the latter and tube 60. 65 is a partition within tube 21, and 66 a partition within tube 22, both placed as near as practicable to steering-head 26, whereby a pneumatic cushion is formed embodying the interiors of tubes 21, 22, and 23, said tubes 22 and 23 being continuous and secured to shells 39 and 40, as shown, or in any other suitable manner. 67 is a casing screwed into tube 60. The same comprises a partition 68, having an opening 69, closed by a spring-valve 70, acting as a check-valve and adapted to open toward the right, Fig. 9, and also an opening 71, adapted to be partly or entirely closed by an adjustable plug-valve 72. The stem of this valve is secured to the interior surface of a flexible diaphragm 73, which forms an air-tight cap at the outer end of casing 67. 74 is a screw mounted within bracket 75 on said casing and adapted to compress said diaphragm. As compression of cushion 52 takes place air is forced into the compartment within casing 67 in the rear of partition 68 and from there through openings 69 and 71, spring-valve 70 being forced open by the air and held open until reaction begins to take place and it closes automatically, whereupon the return flow will only be through opening 71. It will be seen that by screwing down screw 74, and thereby depressing diaphragm 73 and forcing inward valve-plug 72, the effective area of such opening may be reduced and thereby such return flow retarded, whereby the reaction from the compressed condition of cushion 52 may be moderated at will. In addition to actuating valve-plug 72 screw 74 also in compressing diaphragm 73 reduces the cubic contents of the body of air in the cushioning means between the frame-sections, and to that extent increases the air-pressure therein and also within a pneumatic saddle when connected therewith, and it will be seen that the employment of such a diaphragm as 73, attached to and in contact with only one of the relatively movable frame-sections, in combination with means for forcing it inward and allowing to it greater expansion outward as may be desired, offers means of adjusting such air-pressures after inflation has been completed without the necessity of interfering with the adjustment of the contact-points of the frame-section resting upon the movable portion of the adjoining cushioning means. By making the perforated partition 68, which divides the pneumatic cushioning means employed between the relatively movable sections, stationary with reference to one of said sections or attaching it fixedly with reference to the same, I not only provide a very simple construction, but also make it possible to readily regulate the effective area thereof by an adjusting-valve connected therewith from a given point on the outside of the cycle-frame. By fixedly securing the walls of said passage to the walls surrounding and inclosing the air in said chambers I am enabled to obtain by the use of said valve varying relative pressures in said chambers during reaction, while portions of said surrounding walls are being held in yielding contact with one of the frame-sections and without the use of pistons carrying such valves within the pneumatic cushioning means. I also thereby avoid leakage of air around the outer edges of the walls of said passage, which leakage would seriously interfere with the predetermined flow of air between said chambers due to shocks imparted to one of the wheel-sections and reactions therefrom. Besides, by so fixedly securing said walls I am enabled to keep the two communicating air-chambers at all times equal to approximately their original sizes, and when only one of said chambers is provided with a movable wall to keep the other chamber at exactly its original size, thereby avoiding the necessity of displacing a comparatively large body of air for the purpose of obtaining proper cushioning effects during relative displacements of the frame-sections.

Metallic saddle-frame 76 is secured by screw 77 to saddle-pillar 24, which is adapted to be adjusted within socket 61 at varying elevations by means of clamping-ring 78 in usual manner, 79 being a flexible and inflatable pneumatic cushion securely held when inflated upon metallic frame 76. 80 is a tube connecting said cushion with the interior of tube 21 by means of a suitable detachable coupling 80', a proper stop-cock 81 being also provided in said connection. Said tube also is made flexible, so as to permit of varying adjustments of cushion 79 with reference to the saddle-frame. This cushion acts as a complement to the other pneumatic cushioning means described above when stop-cock 81 is open, and it will be seen that during reaction after a shock imparted to wheel 35, which reaction has a tendency to throw the rider off of the seat, said cushion will slightly soften, owing to reduction of pressure within it, and will thus assist the rider in retaining his seat.

If it be desired to make the seat-cushion independent of the air-pressure within the other pneumatic cushioning means, cock 81 would have to be closed after first inflating said cushion through inflation-valve 82 in tube 21 or in any other part of the pneumatic cushioning device. Cushion 52 would be inflated through the same valve. Tube 80 might be made to enter the general pneumatic cushioning system at any proper point, and particularly might enter tube 59 in the rear of partition 68.

It will be seen that owing to the employment of regulating or stop cocks 64 and 81 the cushioning means, comprising saddle-cushion 79, cushion 52, and intermediate parts, may be divided into three chambers, of which one would be a central chamber, comprising the portions between said stop-cocks, while the other chamber would comprise cushions 52 and 79, respectively, and that by fully closing cock 81 the operative cushioning means between the seat-carrying section and the driving-wheel section of the cycle-frame may be limited to the portions of the cushioning means underneath cock 81 and that by closing cock 64 such operative cushioning means would be limited to the portions underneath cock 64 and that in the latter case the saddle-cushion 79 could be operated in conjunction with such intermediate chamber. Finally, by closing both stop-cocks said intermediate chamber might be temporarily cut out entirely from the operative cushioning means. By partly closing cock 81 the operative passage between the saddle-cushion and said intermediate chamber may be restricted at will and cock 64 may be employed for correspondingly restricting flow of air between said lower and said intermediate chambers, particularly, also, in the absence of the regulating-valve 72. Thus provision is made for employing the three air-chambers above referred to in any desired combinations. Under otherwise equal conditions the resilience of a seat of given form and size upon and forming part of a flexible pneumatic saddle-cushion, as 79, depends upon the cubic contents of the body of air which supports said seat, and it will therefore be seen that by connecting the cushioning means between the sections of the frame with the pneumatic saddle-cushion 79 the resilience of the seating-surface of the saddle will be materially increased.

The function of a restricted connecting passage between portions of cushioning means for cycles is to retard the flow of air between different portions of the cushioning means.

when such relative displacements of the frame-sections take place as are incident to the employment of cycles under ordinary conditions of travel, and the advantages derived from the employment of such restricted passages are that after sudden shocks, resulting in relative displacements of the frame-sections, have thus been imparted to the cushioning means equalization of the different air-pressures thereby produced in different portions of the cushioning means separated by the restricted passage will take place gradually not only while such shock is still being imparted, but also afterward, whereby sudden violent reactions may be guarded against, and, where more than two chambers in such cushioning means are so connected by restricted passages, that the air may be forced successively through such chambers and such passages even where a quick succession of shocks takes place—as, for instance, in riding over cobble-stones. The cushioning means will then have the tendency to afford prompt relief in each case—as, for instance, upon increased compression of cushion 52, due to such a succession of shocks, spring-valve 70 will open and close repeatedly and the surplus of air forced through it into the interior of the seat-frame may gradually be forced into the saddle-cushion through such restricted passage as can be provided by keeping stop-cock 81 open to a proper extent. The alternate flow of air within the cushioning means in opposite directions, as described above, and the production of greater pressures in one portion of the cushioning means than in other such portions may be carried to any desired extent, as the cushioning means are closed to the atmosphere.

The front end of the lower rear fork I prefer to articulate to the seat-frame concentric with one of the shafts of the meshing gear-wheels, from which power is transferred to the shaft of the driving-wheel, such as shaft 38. This permits of the employment between the two frame-sections of rigid or approximately-rigid rods as means of transmission of power, such as a connecting-rod, as referred to above, or as the main shaft of a bevel-gear. In general this keeps all parts of the running-gear free from injurious strains which otherwise would result from relative movements of the frame-sections. In the articulating means, as illustrated, 83 83 are three studs placed along the outer surface of shell 39, parallel with each other and approximately equidistant, so as to place their central planes under angles with those of neighboring studs, equal to about one hundred and twenty degrees. Each of said studs is provided with a saddle 84, which is U-shaped in cross-section and adapted to straddle it and to slide crosswise to a slight extent with reference to and upon said stud.

85 is a casing of arc or crescent shaped vertical section extending over the three saddles above referred to and having integral with it a rear shoe 86, which receives and has fixedly attached to it the forward ends of rear lower fork 32. The whole body of said shoe or casing 85 is capable of partly revolving around casing 39, which latter thus serves as a pivot for said shoe. The cross-section of said casing is U-shaped, so as to make its inward-extending flanges 85' fit over the ends of studs 83 and saddles 84, and thereby prevent its accidental lateral displacement after it has been put into its operative position. By the employment of an arc or C shaped shoe, as 85, to which other portions of the driving-wheel frame are attached around casing 39, it is made possible to readily attach and detach such sections at said joint and to maintain the same there in operative contact and also to readily adjust proper cushioning means between said shell and said casing, and where two transverse shafts are used in close proximity, as 29 and 38, and where the shells surrounding the same are joined together, as shown, the arc-shaped shoe 85 is particularly suited for articulating the other frame-section to the outer surface of one of said shells. The employment of a U-shaped shoe, as described, articulated to a tubular shell on one of the frame-sections, also does away with the necessity of either providing a separate pivot between the two frame-sections or of employing a cylindrical shoe specially fitted and shaped so as not to interfere with portions of the frame which directly adjoin said shell, such as parts 22, 23, and 40. 87 represents openings in one of flanges 85', placed adjoining to those parts of said wall which normally face the ends of studs 83 and saddles 84. By sufficiently revolving casing 85 and connecting parts around shell 39, so as to bring said openings opposite said shoes and saddles, said casing may be laterally displaced and detached from shell 39.

A leaf-spring 88 and a washer 89 are interposed between each shoe 84 and the casing 85 and are held in position with reference to said shoe by outer projections 90 near the ends of the latter.

91 indicates screws passing through casing 85 and through leaf-springs 88 into screw-threaded sockets in saddles 84, whereby said saddles can be brought into proper bearing contact with their respective studs 83. By these means relative movement of the two frame-sections so articulated is made possible in directions radial with reference to the axis of shaft 38. The ends of said saddles and studs are made convex and sufficiently rounding vertically as to allow of a slight lateral rocking of said casing 85 thereon, yieldingly resisted by springs 88. This capacity to so rock, together with the action of universal joint 45 and its springs 59, allows of a temporary lateral deflection of the rear-wheel frame, which is useful in turning sharp curves and bends to guard against injuriously springing the bicycle-frame. It also may be depended upon to assist in easing the movement of the running-gear of the bicycle and to accommodate itself to such lateral deflections as may occur in connecting-rod 44, which latter preferably is constructed in sections and provided with a universal joint 92 and a spring 93, inserted between rods 94, capable of playing through one of the plates 95, against which said spring is made to rest for the purpose of imparting to it lateral flexibility. For said spring a flexible and inflatable pneumatic cushion might be substituted.

Figures 1, 2, 3, 8:
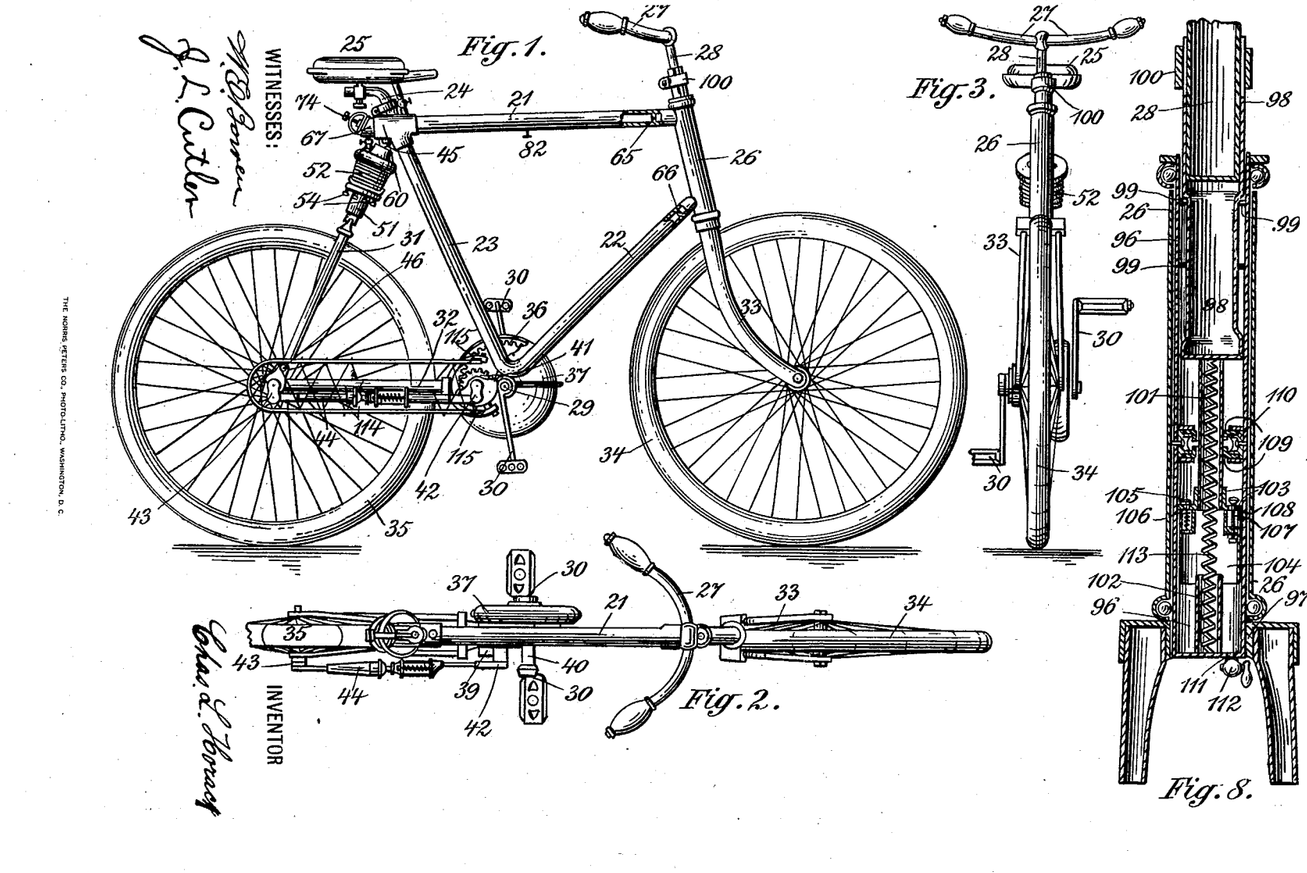

My preferred form of cushioning means employed in connection with the steering-head and front fork is constructed as follows, as shown more particularly in Fig. 8: 96 is a tube fixedly secured to fork-head 97 and revolubly mounted within steering-head 26. 98 is a tube fitting into and adapted to slide within tube 96 and longitudinally guided within the same by studs 99. Its upper portion is slitted, so as to form spring-fingers, which when compressed by clamp 100 in usual manner secure handle-bar stem 28. To a disk at the lower end of said tube 98 a tube 101 is secured, and in line therewith there is a similar tube 102, attached to the bottom of fork-head 97. 113 is a spiral spring interposed between said disk on tube 98 and fork-head 97 and inserted in tubes 101 and 102. The lower end of tube 101 carries an annular flange 103, to the outer periphery of which a tube 104 is attached, so as to fit closely within tube 96. 105 is an automatic valve opening upward adapted to close an opening 106 in flange 103 and normally held closed by a suitable spring $105^\times$, and 107 an adjustable valve adapted to partly or wholly close an opening 108 in said flange. 109 is an air-tight packing around tube 101 and secured by a proper shoe 110 to the interior of tube 96, whereby a stuffing-box is formed by said piston-rod, and 111 an opening leading from the interior of the lower portion of tube 96 through fork-head 97 into the atmosphere, and 112 a stop-cock for wholly or partly closing said opening. Parts 98, 101, 103, and 104 jointly form a plunger operating within tube 96, whereby two air-cushions are formed, one above and the other underneath said plunger. Passage of air around the circumference of the plunger is prevented by the construction of the same, as described, or may be guarded against by any of the well-known means for securing a substantially air-tight fit between a piston or plunger and a cylinder within which it moves. A sudden shock imparted to pilot-wheel 34 as the same passes over an obstruction will cause this plunger to descend and when cock 112 is closed, owing to the use of the air-tight packing 109, to compress the air between said plunger and that part of tube 96 underneath flange 103. Valve 107 being open normally and valve 105 being forced open by increased air-pressure underneath flange 103, air will flow upward then through openings 106 and 108 until reaction sets in and said plunger begins to move in an opposite direction, when valve 105 will close automatically and the return flow of air will take place altogether through opening 108. By adjusting valve 107 the operative area of opening 108 may be reduced or increased, and thereby the force and duration of the reaction modified. As spring $105^\times$ has the tendency to keep valve 105 closed until the air-pressure underneath it materially exceeds that above it, its action will upon slight compression of spring 113 augment the initial force, tending to move tube 98 upward after the same has been forced downward, and to that extent will make the cushion resisting the forcing downward of tube 98 more sensitive when it is subjected to light compressions only. This is beneficial, as only under heavy pressures does it become desirable to temporarily check sudden reactions. The air-pressures at the beginning of the reaction being equal on both sides of the plunger, as spring 113 begins to force said plunger upward its action will be checked in a measure due to the excess of air-pressure thus produced above said plunger and to the formation of a partial vacuum underneath the same until they are neutralized by the return flow of air through opening 108, as described, and the area of such opening will therefore determine to what extent such temporary partial checking of re-expansion of spring 113 will take place.

The more important function of opening 108 is to permit flow of air downward when valve 105 is closed, as it will readily be seen that providing opening 106 be large enough to permit of a sufficient flow of air upward when valve 105 is open it is immaterial whether flow of air through said opening 108 takes place then. For the sake of simplicity of construction it is, however, preferable to keep opening 108 open normally.

Cock 112 may be employed particularly in case it be found that valve 107 as adjusted was obstructing opening 108 too much, when through said cock communication with the surrounding atmosphere might be established to a slight extent, so as to direct portion of the air underneath aforesaid plunger when the latter is being depressed outward through said cock and to let air flow back during the return movement of said plunger, valves 105 and 107 operating meantime in manner as described above. Instead of using a cock 112, as described, a detachable plug might be substituted in its place, the detaching of which would permit access to valve 107 for readjusting its position. The interior of tube 96 above packing 109 is made to communicate with the atmosphere through proper perforations in the adjoining tubes, so as to avoid the formation of air-cushions above said packing adapted to conflict with the operation of the pneumatic cushion underneath flange 103. Spring 113 is intended to further yieldingly resist relative displacement of the handle-bar and the pilot-wheel. The same may either be held in operative contact with plunger 98 101 103 104 and fork-head 97 continuously, as indicated in Fig. 8, or may be shortened, so as to be called into play as an auxiliary of the automatic cushion within the steering-head only after partial compression of said cushion, as explained with reference to spring 55 and cushion 52.

For the protection of the power-transmitting device between shaft 38 and the shaft of the driving-wheel, as well as for the protection of the rider, I provide a suitable dress-guard 114, attached to the rear and forward ends of lower rear fork 32, the rear connection being made in usual manner, while its forward end is attached to suitable lugs 115, projecting outward from shoe 85, whereby said dress-guard will accommodate itself to deflections in the frame without receiving any undue strain. By so bringing the dress-guard, which extends along the power-transmitting device, concentric with the pivot, by means of which the two frame-sections are articulated to each other, I at all times keep said dress-guard in the same position with reference to one of the frame-sections, and where, as in this case, the power-transmitting device works from an axis concentric with said pivot, or approximately so, said dress-guard will always be in the same position, or substantially so, with reference to said power-transmitting device, thus guarding against the interference of one of said parts with the other.

I do not wish to confine myself to the details and the special combinations of parts herein described, as it will readily be seen that material changes might be made in that respect without departing from the spirit of my invention.

Where in the following claims reference is made to means for automatically regulating the flow of air, it is intended to refer to any suitable means whereby during the relative displacements of portions of the cycle the flow of air between different chambers in the pneumatic cushioning means may be or is regulated, owing to and in consequence of such displacements and without the intelligent action of the rider in directly bringing about this result. In the instances herein described pneumatic cushion 52 and also plunger 101 103 104, which during such displacements move with reference to adjoining portions of the cycle-frame, and thereby produce different air-pressures on the two sides of a check-valve, thus actuating said valve, together with said valve, form automatic means for regulating the flow of air, and the valve itself is an automatic valve, as referred to in some of the claims.

In another application now pending before the Patent Office I have described and claimed the features described herein relating to the combination of a pneumatic saddle with pneumatic cushioning means placed between different frame-sections or with an air-chamber within the tubing of the frame and a connecting-passage between said saddle and said cushioning means or said air-chamber, and I therefore do not claim the same in this application. I have also described and claimed in another application now pending before the United States Patent Office features described herein or shown in the accompanying drawings and relating to the use of flexible connections between two pneumatic cushioning means between different sections of the frame, also relating to the employment of two pneumatic cushioning means, with a connection between the same and means for regulating the flow of air through such connection, also relating to the employment of an inflating-valve or inflating-valves in combination with cushions so connected, also to the employment of three air-chambers as cushioning means connected by restricted passages, also to the employment of a frame having a seat-section and two wheel-sections with independent pneumatic cushioning means between the seat-section and each of the wheel-sections, with a restricted passage between the same, and also to the employment of a pneumatic cushion between different frame-sections and a shoe in contact therewith, means for adjusting said shoe with reference to said cushion, and means for varying the pressure within said cushion without varying said adjustment. Such features I therefore do not claim in this application.

I claim—

1. A cushioning device for cycles, comprising a pneumatic cushion divided into two chambers, an automatic valve adapted to permit flow of air from one chamber into the other, and a spring adapted to normally actuate said valve in the same direction, a passage permitting return flow of air being provided between said chambers.

2. A cushioning device for cycles, comprising a pneumatic cushion divided into two chambers, two independent passages being provided between said chambers, and an automatic valve in one of said passages.

3. A cushioning device for cycles, comprising a pneumatic cushion divided into two chambers, an automatic valve adapted to permit flow of air from one chamber into the other, a passage permitting return flow of air being provided between said chambers, and means for regulating the flow of air through said passage.

4. A cushioning device for cycles, comprising a pneumatic cushion divided into two chambers, an automatic valve between said chambers, a return-passage being provided between said chambers, and a regulating-cock therein, the means for actuating said cock being placed outside of said pneumatic cushion.

5. A cushioning device for cycles, comprising a pneumatic cushion divided into two chambers, an automatic valve between said chambers, a return-passage being provided between said chambers, a regulating-cock therein, a flexible diaphragm, a connection between diaphragm and cock for imparting movement of the diaphragm to the cock, and exterior means for actuating said diaphragm.

6. In a cycle, the combination with a sectional frame, of a pneumatic cushion interposed between its sections and comprising two chambers and adapted to yieldingly resist relative displacement of said sections, an inflation-valve, and means for permitting the flow of air between said chambers in one direction, and means for regulating the flow in the opposite direction.

7. In a cycle the combination with the frame, of a pneumatic cushion in said frame and provided with an exterior wall adapted to yieldingly resist relative displacement of the saddle and one of the wheels, a partition in said cushion stationary with reference to said frame, and a valve within said partition for regulating the flow of air through the same.

8. In a cycle, the combination with its frame, of a pneumatic cushion adapted to yieldingly resist relative displacement of the saddle-frame and one of the wheels, a passage between two chambers in the cushion, and a valve in said passage, the walls of the passage being fixedly secured to the walls of the cushion surrounding and confining the air in said chambers.

9. A cushioning device for cycles comprising an air-chamber, a movable wall within said chamber whereby the same is divided into two compartments, a spring adapted to be actuated by the movement of said wall and to actuate said wall during its return movement, and an automatic valve between said compartments adapted to permit flow of air from one of said compartments into the other when the spring is being so actuated, a passage permitting return flow of air being provided between said compartments.

10. A cushioning device for cycles comprising an air-chamber, a movable wall within said chamber whereby the same is divided into two compartments, a spring adapted to be actuated by the movement of said wall and to actuate said wall during its return movement, an automatic valve between said compartments adapted to permit flow of air from one of said compartments when the spring is being so actuated, a passage permitting return flow of air being provided between said compartments, and means for adjusting the area of such passage.

11. A cushioning device for cycles, comprising an air-chamber, a movable wall within said chamber whereby the same is divided into two compartments, a spring adapted to be actuated by the movement of said wall and to actuate said wall during its return movement, and means for permitting flow of air between said compartments while the spring is being so actuated, and for permitting and automatically regulating flow of air in the opposite direction during such return movement.

12. In a cycle, the combination with its frame, the saddle and the running-gear, of a spring mounted upon said frame and adapted to be actuated by the lowering of the saddle-frame with reference to one of the wheels, and means for freely permitting action of said spring during such lowering of the saddle-frame and for regulating and retarding corresponding reaction of said spring during upward movement of the saddle-frame.

13. In a cycle, the combination with the running-gear, of a frame comprising a sectional steering-post having one section adapted to slide and to revolve with reference to said steering-head, a spring adapted to yieldingly resist such sliding movement in one direction, and means for freely permitting action of the spring while it slides in such direction, and for regulating and retarding corresponding reaction of said spring while it slides in the opposite direction.

14. A cushioning device for cycles, comprising an air-chamber having a movable wall, a spring adapted to be actuated by the movement of said wall and to actuate said wall during reaction from such movement, an automatic valve adapted to admit air to said chamber while the spring is being so actuated, a restricted outlet-passage open during reaction from such movement being provided in said chamber, and a spring for forcing said valve toward its closing position.

15. A cushioning device for cycles, comprising a cylinder with suitable heads, a piston moving therein, whereby an air-chamber is formed on each side of said piston, the piston-rod, a substantially air-tight stuffing-box for the same, a spring for actuating said piston, an automatic valve adapted to permit flow of air from one chamber into the other, a passage permitting return flow of air between said chamber and a passage between one of said chambers and the atmosphere being provided, and a regulating-cock in the last-named passage.

16. A cushioning device for cycles, comprising a cylinder with suitable heads, a piston moving therein, whereby an air-chamber is formed on each side of said piston, the piston-rod, a substantially air-tight stuffing-box for the same, an automatic valve between said chambers, and means for alternately conducting air into said chambers.

17. In a cycle, the combination with a sectional frame and the running-gear, one of the sections of the frame being articulated to the other section and capable of relative displacements in different directions radial to the axis of the joint between the two sections, of elastic resisting means interposed between said sections and adjusted to resist said displacements.

18. In a cycle, the combination with a sectional frame and the running-gear, one of the sections of the frame being articulated to the other section and capable of relative displacement in a direction radial to the axis of the joint between the two sections, of a spring capable of yieldingly resisting such displacement, and means interposed between said sections and for adjusting the tension of such spring.

19. In a cycle, the combination with a sectional frame and the running-gear, one of the sections of the frame being articulated to the other section and capable of relative displacements in different directions radial to the axis of the joint between the two sections, of elastic resisting means interposed between said sections and having independent contact-points in engagement with one of said sections.

20. In a cycle, the combination with a sectional frame and the running-gear, of a universal joint interposed between two frame-sections capable of relative displacements in the plane of said frame and also lateral thereto, and elastic resisting means interposed between said sections for yieldingly resisting such displacements of the frame-sections at said joint.

21. In a cycle, the combination with a frame comprising two sections and a pivot between said sections, of a power-transmitting device between said pivot and a wheel on one of said sections, and a dress-guard secured to said wheel-carrying section and revolubly mounted upon the other section concentric with said pivot and extending along said power-transmitting device.

22. In a cycle, the combination with a sectional frame and the running-gear, one of the sections of the frame being articulated to the other section and thereby adapted to swing in the plane of said other section, and being also capable of lateral displacement in relation to said other section, of a yielding cushion for resisting such swinging movement, and an elastic tension device independent of said cushion for resisting such lateral displacement.

23. In a cycle, the combination with a sectional frame and the running-gear, portions of the sections of the frame being capable of relative displacements in the longitudinal plane of one of said sections toward and away from each other, and also lateral thereto, of a cushion for yieldingly resisting such longitudinal displacement, and an independent elastic tension device for resisting such lateral displacement.

24. In a cycle, the combination with a sectional frame and the running-gear, the sections of the frame being articulated and joined together at two points and capable of relative displacements at each of said joints lateral to the longitudinal plane of one of said sections and capable of swinging in said longitudinal plane, of two independent elastic tension devices interposed between said sections, one adjusted to yieldingly resist lateral displacement at one of said joints and the other adjusted to yieldingly resist lateral displacement at the other joint, and means for yieldingly resisting such swinging movement in the longitudinal plane.

25. In a cycle, the combination with a sectional frame, and the running-gear, of pneumatic cushioning means adapted to yieldingly resist relative displacements of two of the frame-sections, a wall adapted to yield under changing pressures forming portion of said cushioning means and mounted upon a rigid portion of one of said sections and not in contact with the other section, a contact device attached to the section to which said wall is attached, and means for adjusting the relative positions of said wall and said contact device, and thereby adjusting the capacity of the cushioning means after inflation.

26. In a cycle, the combination with a sectional frame and the running-gear, of pneumatic cushioning means adapted to yieldingly resist relative displacements of two of the frame-sections, a wall adapted to yield under changing pressures forming portion of said cushioning means and mounted upon a rigid portion of one of said sections and not in contact with the other section, a pneumatic saddle, a connecting-passage between saddle and cushioning means, a contact device attached to the section to which said yielding wall is attached, and means for adjusting the relative positions of said wall and said contact device and thereby adjusting the capacity of the cushioning means after inflation.

27. In a cycle, the combination of a sectional frame, the crank-shaft, the shaft of the driving-wheel and an intermediate shaft parallel thereto, meshing gear-wheels mounted on two of said shafts, and a power-transmitting device on the third shaft, two of said shafts being on one section of the frame and the other shaft being on the other section, said two sections being fulcrumed concentrically with one of the shafts carrying said meshing gearing.

28. In a cycle, the combination with a sectional frame and the running-gear, one of the sections of the frame carrying a shaft forming portion of the running-gear, a shell around said shaft, a portion of the cycle-frame being attached to the circumference of the shell, and an arc-shaped shoe rigidly attached to the other section and articulated upon said shell, the whole body of said shoe being adapted to partly revolve around said shell.

29. In a cycle, the combination with a sectional frame and the running-gear, one of the sections of the frame carrying a pivot, and an arc-shaped shoe rigidly attached to the other section and articulated upon said pivot, the whole body of said shoe being adapted to partly revolve around said pivot and to be slid along said pivot, and means for confining said shoe in its operative position.

30. In a cycle, the combination with a sectional frame and the running-gear, one of the sections of the frame carrying a pivot, of an arc-shaped shoe rigidly attached to the other section and articulated upon said pivot, and flanges on said shoe adapted to engage with suitable contact-surfaces on the frame-section comprising said pivot, the whole body of said shoe being adapted to partly revolve around said pivot and to be slid along said pivot into and out of its operative position.

31. In a cycle, the combination with a sectional frame and the running-gear, one of the sections of the frame carrying a pivot, of an arc-shaped shoe forming portion of the other section and articulated upon said pivot, flanges placed along the circumference of said arc, cushioning means between said pivot and said shoe, convex bearing-surfaces being provided on the section carrying the pivot adapted to engage with said flanges.

32. In a cycle, the combination with a sectional frame, of a flexible cushion adapted to yieldingly resist relative displacements of the sections of the frame, shoes adapted to coact with different portions of said cushion in resisting such relative displacements in the same direction, and means for adjusting the position of one of said shoes with reference to said cushion independent of the position of another such shoe.

33. In a cycle, the combination with a sectional frame and its wheels, of a power-transmitting device interposed between two shafts of the running-gear, portions of the frame carrying said shafts being capable of relative angular displacement, whereby the relative alinement of said shafts can be varied, and elastic means for yieldingly resisting such displacement.

34. In a cycle, the combination with a sectional frame, one of the sections of the frame being capable of angular displacement with reference to the plane of the other section, of an elastic tension device for yieldingly resisting such displacement, and a power-transmitting device mounted upon both sections and comprising a sectional connecting-rod, flexible laterally, and means for yieldingly resisting its deflection.

35. In a cycle, the combination with the frame, the saddle and the running-gear, of cushioning means for yieldingly resisting relative displacement of the seating surface of the saddle and one of the wheels, a rigid hollow casing detachably secured to and connected with said cushioning means, whereby the body of air in the interior of said casing is made to coact with the cushioning means, and a restricted passage and a valve for regulating the flow of air through said passage, both placed within said detachable casing.

36. In a cycle, the combination with the frame, the saddle and the running-gear, of cushioning means for yieldingly resisting relative displacement of the seating surface of the saddle and one of the wheels, a rigid hollow casing detachably secured to one of the sections of the frame and connected with said cushioning means, whereby the body of air in the interior of said casing is adapted to coact with the cushioning means, a partition and a valve for regulating the flow of air through the same both placed within said casing, and means for actuating said valve placed outside of said casing.

37. In a cycle, the combination with the frame, the saddle and the running-gear, of cushioning means for yieldingly resisting relative displacements of the seating surface of the saddle and one of the wheels, a hollow sectional casing attached to the frame and connected with said cushioning means, and a restricted passage and means for regulating the flow of air through the same both placed within said casing, one section of said casing forming a detachable cap for separating the interior of said casing from the atmosphere.

In testimony that I claim the foregoing as my invention I have signed my name, in presence of two witnesses, this 3d day of August, 1897.

CHARLES L. HORACK.

Witnesses:
 WM. J. PARSONS,
 HENRY E. JOËL.